(12) United States Patent
Luecking et al.

(10) Patent No.: US 9,384,725 B2
(45) Date of Patent: Jul. 5, 2016

(54) TRANSMISSION PATH COMPENSATOR

(75) Inventors: Christof Luecking, Wetter (DE); Sebastian Pietrzyba, Moenesee (DE)

(73) Assignee: EBERSPAECHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 666 days.

(21) Appl. No.: 13/449,204

(22) Filed: Apr. 17, 2012

(65) Prior Publication Data
US 2012/0288111 A1    Nov. 15, 2012

(30) Foreign Application Priority Data
Apr. 21, 2011 (DE) .......................... 10 2011 018 459

(51) Int. Cl.
*G10K 11/16* (2006.01)
*G10K 11/178* (2006.01)

(52) U.S. Cl.
CPC .. *G10K 11/1782* (2013.01); *G10K 2210/12822* (2013.01); *G10K 2210/503* (2013.01)

(58) Field of Classification Search
CPC ................................................ G10K 2210/112
USPC .................. 381/71.1, 71.4, 71.5; 181/206
See application file for complete search history.

(56) References Cited

U.S. PATENT DOCUMENTS

| 5,233,137 | A | 8/1993 | Geddes |
| 5,692,052 | A | 11/1997 | Tanaka et al. |
| 7,753,165 | B2 | 7/2010 | Kassner |
| 7,891,463 | B2 | 2/2011 | Krüger et al. |
| 8,270,628 | B2 * | 9/2012 | Evert .................. G10K 11/178 181/206 |

(Continued)

FOREIGN PATENT DOCUMENTS

| DE | 10 2006 061 564 | 7/2008 |
| DE | 2008 018 085 | 10/2009 |
| DE | 10 2009 031 848 | 1/2011 |

(Continued)

OTHER PUBLICATIONS

Office Action in Japanese application 2012-093565, mailed Jun. 18, 2013.

*Primary Examiner* — Disler Paul
(74) *Attorney, Agent, or Firm* — Morris & Kamlay LLP (57) ABSTRACT

The invention relates to a system for generating anti-noise in an exhaust-gas line (9) of a vehicle, comprising a first electro acoustic transducer (11) for generating a first acoustic signal based on an electric control signal, and being in communication with the exhaust-gas line via an acoustic line (4, 7), with the first acoustic signal entering the exhaust line in form of anti-noise after having passed the acoustic line, a second electro acoustic transducer (13) for generating an electric measurement signal representing a second acoustic signal, and being in acoustic communication with the exhaust-gas line (9) at the anti-noise coupling region, a control unit (21) for generating the control signal based on the measurement signal, and a parameterizing unit (29) for determining a conforming phase parameter and a conforming magnitude parameter for the control function used by the control unit (21) based on the transient response of the control unit.

12 Claims, 4 Drawing Sheets

(56) References Cited

U.S. PATENT DOCUMENTS

| | | |
|---|---|---|
| 2003/0016833 A1 | 1/2003 | Harvey |
| 2003/0079937 A1* | 5/2003 | Vaishya ............ G10K 11/1788 181/206 |
| 2005/0084115 A1* | 4/2005 | Enamito ............ G10K 11/1782 381/71.7 |
| 2007/0186895 A1* | 8/2007 | Ochi ........................ 123/198 E |
| 2008/0173496 A1 | 7/2008 | Kassner |
| 2009/0255754 A1 | 10/2009 | Krüger et al. |
| 2011/0000734 A1 | 1/2011 | Krüger et al. |

FOREIGN PATENT DOCUMENTS

| | | |
|---|---|---|
| JP | H05-209563 | 8/1993 |
| JP | H08-177453 | 7/1996 |
| JP | H09-242628 | 9/1997 |
| JP | H09-250409 | 9/1997 |
| JP | H09-310646 | 12/1997 |

* cited by examiner

TRANSMISSION PATH COMPENSATOR

The invention relates to active sound absorption of exhaust gas systems of vehicles driven by internal combustion engines.

An alternative or supplement to reducing the sound emission of vehicle exhaust gas systems, for example silencers, so-called active noise cancellation systems which superimpose the noise pulse sequences emitted from the internal combustion engine of a vehicle with electro-acoustically generated anti-noise pulse sequences have been under development for quite some time.

Such active silencing systems have an acoustic signal originating from a sound generator input to the exhaust pipe via a connecting element. The superimposition of the sound waves originating from the internal combustion engine with the sound waves of the acoustic signal takes place around the coupling region located where the connecting element joins the exhaust pipe. To achieve a destructive interference of both sound waves in the region where they are superimposed, the form and the magnitude of the sound waves originating from the acoustic signal of the sound generator have to correspond to the sound waves originating from the internal combustion engine in the region of super-imposition but need to have, however, relative to the latter, a phase shift of 180°.

Electro-acoustical transducers converting a low frequency electrical input signal into a sound signal of more of less similar waveform are typically used as sound generators. The electric input signal is based on a so-called control signal, generated by a control unit which is then amplified. The result of the destructive sound wave superimposition is determined using a microphone placed at the superimposition region, whereby pressure sensors may be used instead of a microphone. The output signal forms a feedback variable to the control unit.

In this context it is noted that if it is not explicitly stated otherwise, the term "controlling" is used in this document differently to German language established terms synonymous with the term "regulating". This concerns also all grammatical modifications of both terms. The term "control" may in this document therefore comprise a feedback of a feedback variable or their respective measurement value as well as the German "regulation" may apply to a simple control chain.

Like the acoustic properties of the sound generator housing and the connector element, also the transfer functions of electric and electro-acoustic components of the system result a modification of the signals such that the waveform of the sound waves arriving at the coupling region as anti-noise are quite different to their corresponding control signal.

The control signal is therefore generated by the control unit taking account of the signal transmission paths, i.e. taking account of the transfer function of the amplifier, the transforming characteristics of the sound generator, the influences of the volume accommodating the sound generator, the acoustic properties of the connector element coupling the sound generator housing with the exhaust pipe, the transforming properties of the microphone and of possible downstream filters.

The transfer function indicates the function relationship between the output signal of the microphone and the control signal. The frequency dependent transfer function can while the engine is shut down, for example, be determined by generating a control signal in form of a frequency sweep, i.e. a control signal which frequencies are tuned in the relevant region, and monitoring the output signal of the microphone resulting therefrom. The measurement is repeated at different temperatures of the exhaust-gas system since the propagation of sound waves in gases changes with the temperature of the gases so that the frequency and temperature parameters for characterizing the transfer function by magnitude and phase are finally obtained.

The control unit typically comprises a plurality of regulators for achieving an ideal noise cancellation. Each of the regulators produces a control signal for a particular sub-region of the frequency band of interest, independent from the other regulators.

The frequency spectrum of the sound waves emitted from the engine comprise several maxima, called engine orders, which each represent a (not necessarily an integer) multiple of a fundamental frequency typically correlated with the engine speed. In a stationary or quasi-stationary operation of the engine, the frequency bands associated with the engine orders are stationary, while in dynamic operation, the frequency bands change their position relation to the particular engine speed.

For synchronization with the sound waves emitted from the engine, the control unit therefore uses specific operation signals representative for particular conditions of the internal combustion engine, for instance crankshaft speed and firing frequency. These signals are usually obtained from the motor control unit but may also be generated by sensors disposed in the exhaust line.

Under normal operating conditions, the vehicle exhaust-gas system is subject to considerable temperature fluctuations, humidity, aggressive condensate, deposits and vibrations that may result is a modification of the transfer function, and may hence have an adverse effect on the efficiency of the noise cancellation.

It is therefore desirable to provide an active noise cancellation system enabling an effective noise cancellation even under conditions of a changing transfer function.

Embodiments of such a noise cancellation system comprise a first electro acoustic transducer configured for generating a first acoustic signal based on an electric control signal and being in communication with the exhaust pipe via an acoustic line. After passing the acoustic line, the first acoustic signal enters the exhaust line in the form of anti-noise. Said system for generating anti-noise in the exhaust line of a vehicle further comprises a second electro acoustic transducer configured for generating an electric measurement signal representing a second acoustic signal and being in acoustic communication with the exhaust line at the anti-noise coupling region, and a control unit configured for generating the control signal based on the measurement signal, and a parameterizing unit adapted for determining a conforming phase parameter and a conforming magnitude parameter for the control function used by the control unit based on the transient response of the control unit.

Embodiments of such noise cancellation systems are further adapted to perform a method comprising the following steps for determining a conforming phase parameter and a conforming magnitude parameter:

a) Initializing the generation of a control signal by the control unit using a phase parameter ranging from $-\pi$ to $+\pi$, b) Determining the amplitude characteristics of the control signal, c) Analysing if the amplitude values of the amplitude characteristics show an oscillation behaviour, d) Storing the phase parameters with a tag, the tag indicating if there is evidence for an oscillation behaviour or not, e) Surveying the phase parameters stored with a tag for the presence of two phase parameters having a tag indicating an oscillation behaviour and enclosing only phase parameters having tags indicating no oscillation behaviour, f) In the event of the survey in step e) yielding a negative result: continuing the method at step a) with the proviso that a phase parameter is used in step b) that is different from previously used phase parameters, g) Determining the conforming phase parameter to be half the sum of the two phase parameters identified in step e) in the event of the survey of step e) yielding a positive result, h) Resetting the control unit into an initial state, i) Initializing the generation of a control signal by the control unit using a magnitude parameter differing from the magnitude parameter used in steps a) to g) by a positive factor, j) Determining the amplitude characteristics of the control signal, k) Analyzing the amplitude characteristics for transient overshoots, l) Continuing the method at step h) with the proviso that a greater magnitude parameter is used in step i) when an overshoot is determined in step k), and determining the transient time from the amplitude characteristics when no overshoot is determined in step k), m) Checking if the transient time is smaller than a predetermined threshold value, n) Continuing the method at step h) with the proviso that smaller magnitude parameter is used in step i), when the check of step m) results a transient time greater or equal than the predetermined threshold value, and o) Determining the magnitude parameter used last as the conforming magnitude parameter, when the check of step m) results a transient time smaller than the predetermined threshold value.

According to advantageous embodiments, a predetermined value forms the threshold value, while according to others likewise advantageous embodiments the smallest previously determined transient time forms the threshold value. Further advantageous embodiments include a step for resetting the control unit in an initial state which is performed prior to step a). According to further embodiments, it is further analysed in step c), if the maximum value of an amplitude oscillation period is greater than the maximum value a previous amplitude oscillation period so that an instability of the regulator or the control unit can be determined reliably.

It is noted that the terms "comprise", "have", "include", "contain", and "with" as well as their grammatical modifications are generally to be considered as a non-exhaustive listing of features, like, e.g. method steps, means, ranges, entities and the like, and by no means exclude the presence of other or additional features or groups of other or additional features.

According to preferred embodiments the parameterizing unit is configured for reinitializing the control unit, whereby re-initialization comprises an initiating of the generation of the control signal using at least one of a specific phase parameter and a magnitude parameter, and, as the case my be, a prior resetting of the control unit in an initial state.

Preferred embodiments further include a parameterizing unit configured for determining at least one of a temporal characteristic of the control signal and the measurement signal, with the parameterizing unit being advantageously possibly configured for determining a transient time, an overshooting behaviour, and an instability of the operation for generating the control signal performed by the control unit from the temporal characteristics of at least one of the control signal and the measurement signal. A transient time signifies the time period from the onset of the process for generating a control signal until the time, when the control signal achieves it's characteristic required for minimizing the effective value of the measurement signal. The parameterizing unit of the previously explained embodiments may practically be configured to determine two borderline phase parameters yielding an unstable control operation and enclosing an interval of phase parameters yielding a stable control operation from the different phase parameters ranging from $-\pi$ to $+\pi$ used for reinitializing the control unit. A control operation hereby signifies the process running in the control unit for generating the control signal. The conforming phase parameter is advantageously determined as half the sum of the two borderline phase parameters, since this value always results in a generation of an ideal control signal.

Embodiments have the parameterizing unit preferably configured for carrying out the determination of the confirming magnitude parameters after a determination of the conforming phase parameters, since this always enables an evaluation of stable transient response of the signal generation. For evaluating the transient responses, advantageous embodiments have the parameterizing unit being configured to determine the transient time of the operation for generating the control signal at each re-initialization of the control unit and to determine the conforming magnitude parameter as the magnitude parameter associated with the smallest resulting transient time. The different magnitude parameters are preferably determined by multiplying the magnitude parameter used prior to a re-initialization by a factor having a value greater than zero.

Embodiments of systems for generating anti-noise in the exhaust line of an internal combustion engine as explained above are preferably used in motor vehicles equipped with internal combustion engines.

Further features of the invention will be apparent from the following description of particular embodiments in combination with the claims and the figures. It is noted that the invention is not limited to the configurations of the exemplary embodiments explained, but is defined by the scope of the claims attached. In embodiments according to the present invention, the individual features may in particular be implemented in different combinations and numbers than in the examples explained below. In the following explanations of some exemplary embodiments of the present invention, reference is made to the attached drawings in which

In the figures, elements having substantially the same technical functions have been given the same reference numerals. Different configurations of these elements have similar reference numerals. Further, for the sake of clarity, only those elements, components and functions are shown in the figures, which help to understand the present invention. Embodiments of the invention are, however, not limited to the elements, components and functions shown, but comprise further elements, components and functions as far as these are necessary for their use or their range of functions.

Figure 1:
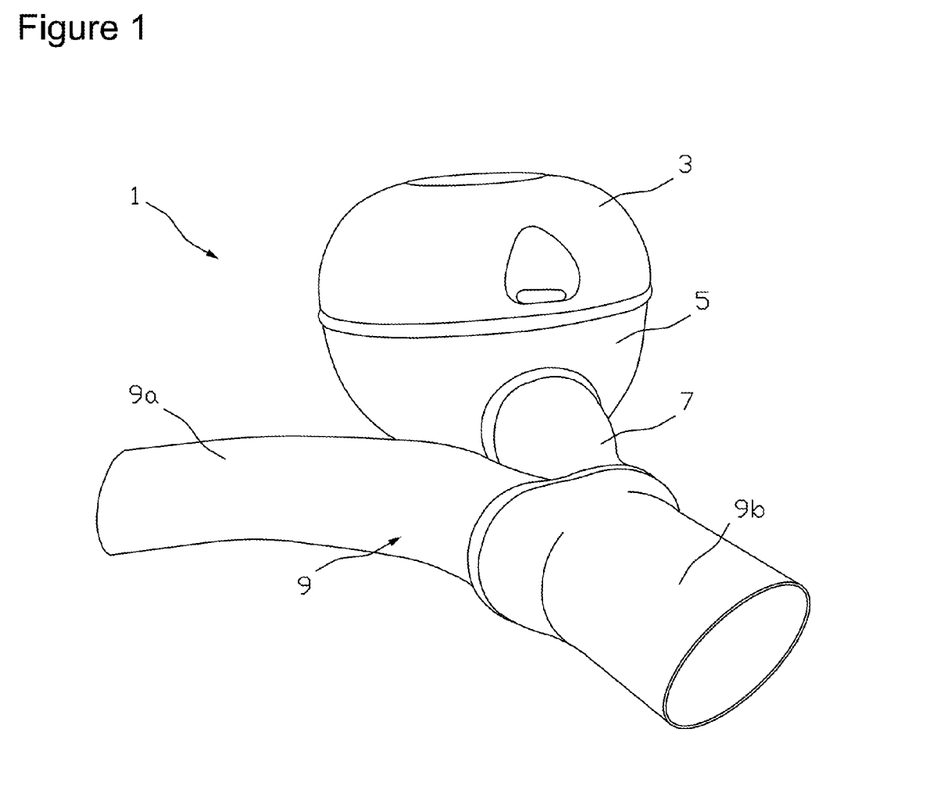
FIG. 1 shows a schematic presentation of a perspective view of an active noise cancellation system.

FIG. 1 shows a perspective schematic representation of an active noise cancellation system 1. The noise calculation system comprises a sound generator housing formed of a top shell 3 and a bottom shell 5, and being in acoustic communication with the exhaust line 9 via connector member 7. Noise pulse sequences emitted from the engine pass section 9a of the exhaust line and are introduced into section 9b of the exhaust line where they superimpose with the sound emitted from the sound generator housing. Since the superimposition has to be destructive for achieving noise cancellation, the sound originating from the sound generator housing is also called anti-noise.

Figure 2:
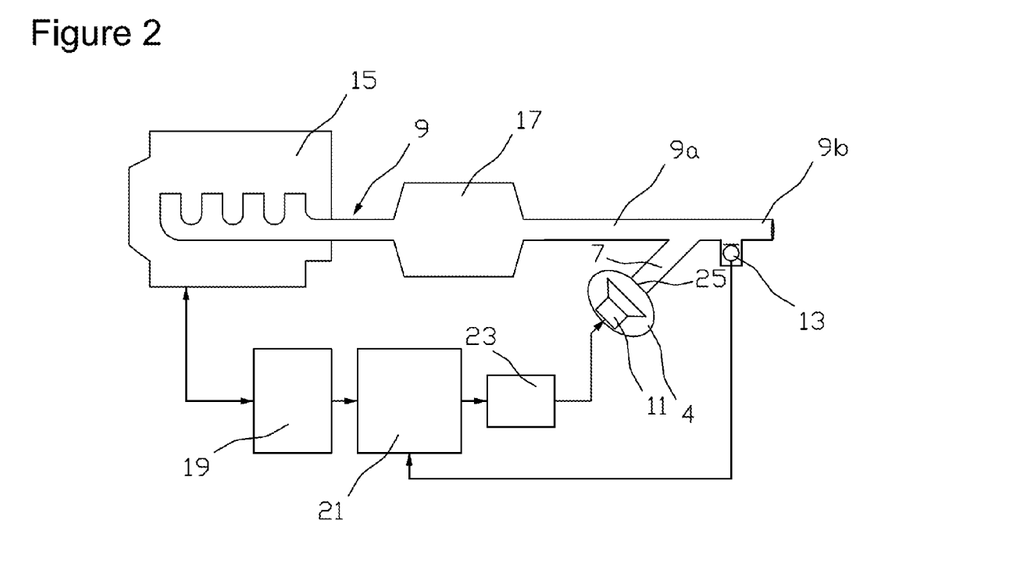
FIG. 2 illustrates a schematic representation of an active noise cancellation system interacting with an exhaust-gas system of an internal combustion engine.

The configuration of a noise cancellation system 1 can be understood from the schematic representation of FIG. 2. The exhaust gases emitted from an internal combustion engine 15 are discharged into the environment via an exhaust line 9. A catalyser 17 for a subsequent chemical treatment of the exhaust gases is usually, but with respect to the working of the invention not necessarily, arranged in the exhaust line 9. Further, also a conventional silencer (not shown in the Figure) can be disposed in the exhaust line 9. In addition to the exhaust gases also sound pulse sequences generated by the combustion process in the engine 15 pass the exhaust line 9. For reducing the associated noise emission, an acoustic signal is generated using an electro-acoustic transducer 11 located in the sound generator housing 4, and is introduced into the end section 9b of the exhaust line 9 via the connector member 7 where it is superimposed to the sound pulse sequences originating from the engine as anti-noise. In the event of the anti-noise and the sound pulse sequences being identical in magnitude and form but in phase opposition, the superimposition inside the end section 9b is destructive and a noise cancellation is achieved.

Figure 3:
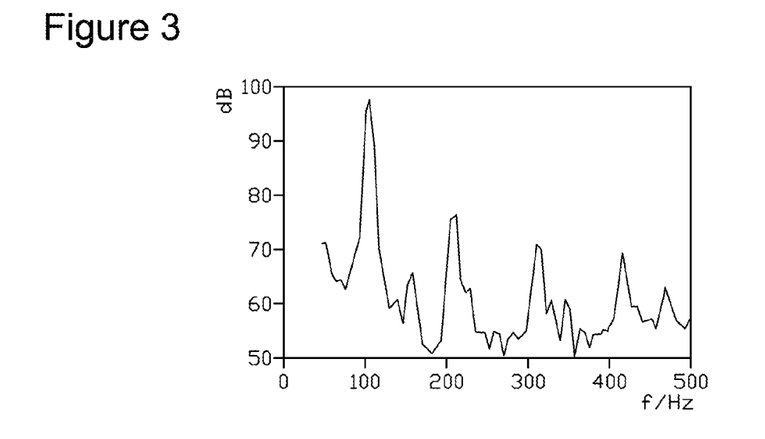
FIG. 3 represents the frequency dependence of the sound pressure in the exhaust line for a stationary operational state of an internal combustion engine.

The combustion process within the engine 15 affects the temporal characteristic and the frequency spectrum of the sound pulse sequences. The rotational speed and the firing frequency of the engine are important factors therefor, but also higher emission orders resulting from the inertial forces of the engine 15 are of importance. FIG. 3 shows an example for the frequency characteristic of the noise pressure level present in the exhaust line 9 for a particular stationary operating condition of the internal combustion engine. It can be seen in the diagram of FIG. 3 that the noise pressure is at a certain frequency and multiples of this frequency significantly higher than in the remaining frequency range. These noise emission orders are called engine orders.

The entities affecting the engine orders like rotational speed and firing frequency are determined or specified by the motor control unit 19 and transmitted from there to the anti-noise control unit 21. Alternatively or additionally, one or more sensors (not shown in the Figure) can be arranged on the exhaust line 9 for determining the sound pulse sequences or parameters relevant for noise propagation like for example exhaust-gas temperature, exhaust-gas speed and exhaust-gas humidity.

A second electro-acoustic transducer is located in the coupling area for the anti-noise at the end section 9b of the exhaust line 9 for converting the sound pressure of sound waves passing that section into a corresponding electrical measurement signal. The measurement signal is fed to the anti-noise control unit 21 as a feedback variable.

The anti-noise control unit 21 generates a control signal that, after having been amplified by the amplification unit 23, is input to the electro-acoustic transducer and converted into an acoustic signal therein. The acoustic signal is supplied to the exhaust line 9 via the connector member 7 and is superimposed in end section 9b with the sound pulse sequences originating from the engine as preferably destructive anti-noise. For protection of the first acoustic transducer 11 from dirt accumulation and corrosive gases, the volume accommodating it can be sealed with a sound-conducting diaphragm 25.

The control signal is generated by the anti-noise control unit 21 using specific characteristic operational parameters of the engine and the measurement signal. Phase and magnitude components of the transfer function characterizing the relation between the anti-noise and the control signal also form parameters that are part of the control function for generating the control signal. The control signal is generated such that the effective value of the measurement signal is minimized. The control unit may comprise, as already mentioned above, several regulators operated independently from each other, with each regulator generating a portion of the control function that is limited to a frequency subsection typically associated with one engine order. The control unit 21 explained in this document also includes such multi-regulator control units 21.

Currently, the parameters of the control function are predetermined for specific stationary operating conditions of the engine and are selected by the anti-noise control unit 21 according to the associated characteristic operating parameters of the engine. The conditions at which the parameters have been determined differ, however, frequently from the conditions present in the exhaust-gas system during vehicle operation. The conditions for the noise propagation may for instance change due to deposits or condensate in the connector member 7 and in the end section 9b. Vibrations and corrosive influences may alter the transducer characteristic of the electro-acoustic transducer 11 or 13, temporarily as well as permanently. If the differences between the phase and magnitude parameters used by the anti-noise control unit 21 and those valid for the current transfer function are too big, a low efficiency of the noise cancellation may result.

Figure 4:
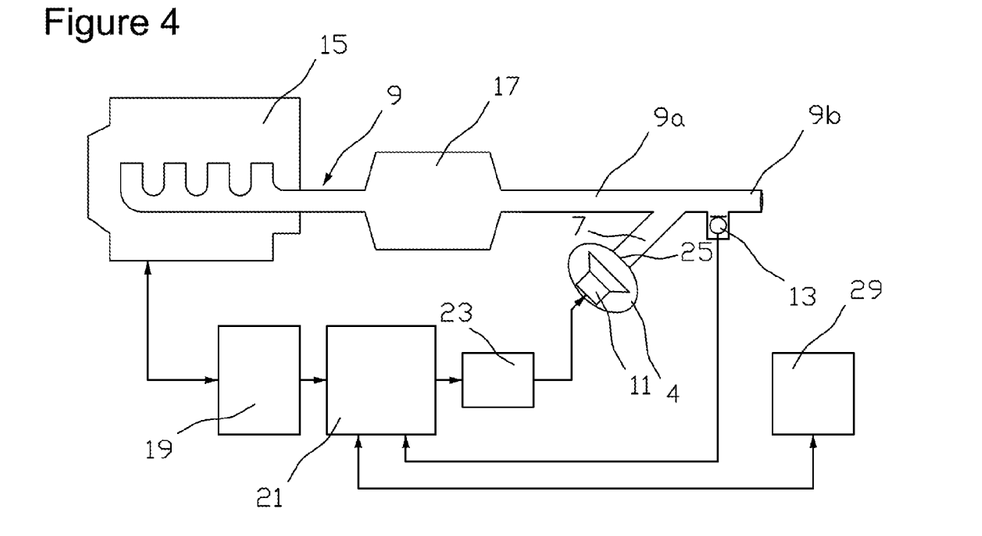
FIG. 4 shows a schematic representation of an active noise cancellation system having a parameterizing unit.

For diagnostic purposes as well as for adapting the control signal generation to changes in the transfer function, embodiments of a noise cancellation system 1 therefore comprise a parameterizing unit 29 as illustrated in FIG. 4 that is configured for determining parameters conforming to a current transfer function.

A determination of the phase and magnitude values currently valid for a current operating condition of the engine is based on the analysis of the transient response of the anti-noise control unit 21. If the phase and magnitude parameters used for generating the control signals represent the values valid for the current transfer function, the transient time of the control unit is very short. To put it another way, if the phase and magnitude parameters conform to the current transfer function, the time within which the control signal achieves its characteristic necessary for minimizing the effective value of the measurement signal is minimal.

For determining the phase and magnitude parameters conforming to a current transfer function, the parameterizing unit 29 initializes or reinitializes the anti-noise control unit 21 and analyses the transient response of the anti-noise control unit 21 with the thereby used new phase and magnitude parameters. Reinitializing unit in this context an operation resetting the anti-noise control unit 21 into an initial state followed by initializing the control signal generation with phase and magnitude parameters transmitted from the parameterizing unit 29 to the anti-noise control unit 21.

The conforming phase and magnitude parameters are each time determined in two stages. In the first stage, only the phase parameters are changed—in doing so the magnitude parameter used for the current engine operating condition is maintained. In the second stage, the magnitude parameter is changed, whereby the conforming phase parameter determined in the first stage is maintained as phase value.

The parameterizing unit 29 prompts the initialization of the anti-noise control unit 21 in the first stage with different phase parameters ranging from $-\pi$ to $+\pi$ and analyses the respective transient response of the anti-noise control unit 21 until two phase values have been identified by which the anti-noise control unit 21 shows an unstable transient response and which narrows down a range of phase parameters by which the transient response of the anti-noise control unit 21 is stable. The conforming phase parameter is defined as half the sum of these two phase values.

The first stage can also be performed during a driving operation of a vehicle equipped with the engine 15 and it is in particular advisable when the output signal of the microphone 13 shows higher values than usual, when the engine is operated dynamically, that is when changing the rotational speed, thereby signalling a degraded noise cancellation. Resetting the control unit 21 to an initial state, followed by initiating the generation of the control signal using a new phase parameter is not required in this case, since the transient response of the control unit is already initiated by prompting a new phase value. For checking the validity of a current phase value, the transient response of the anti-noise control unit 21 can be analysed during a corresponding stationary or quasi-stationary operation of the engine using two test phase values having a phase value leading or lagging the current one by a specific phase offset, for instance having a phase difference of $+\pi/10$ to $-\pi/10$. The phase offset is hereby selected such that in the event of a valid current phase value, the regulation behaviour of the anti-noise control unit 21 is stable for both phase offsets but will be unstable for at least one of the two phase offset values in the event of an invalid current phase value. In this event, a recalibration of the phase value is performed or a maintenance information generated.

In the second stage, the parameterizing unit 29 repeats a re-initialization of the anti-noise control unit 21, for instance by turning it off and on again, using the conforming phase parameters but with altered magnitude parameters.

Figure 5:
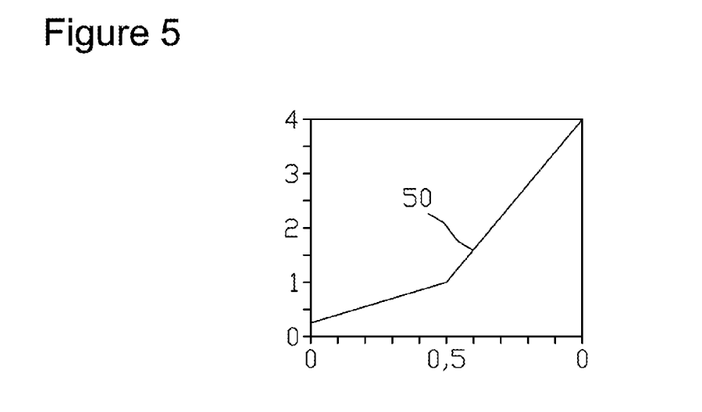
FIG. 5 shows a factor characteristic for selecting factors for the alteration of magnitude parameters.

According to an embodiment, the altered magnitude parameters are determined by multiplying the magnitude parameters used in the first stage with a factor. Preferably, the factors are selected from a characteristic like for instance the characteristic 50 shown in FIG. 5. The magnitude parameter determined as conforming magnitude parameter is the one resulting in the shortest transient time. The determination can be effected by selecting the magnitude parameter resulting in the shortest transient time, but also by interpolation.

Figure 6:
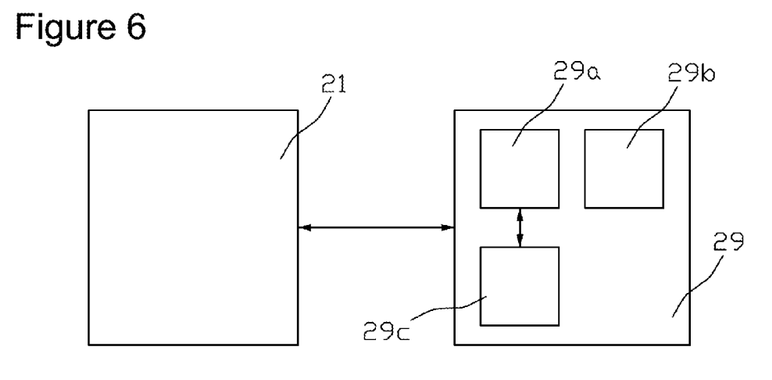
FIG. 6 illustrates components of a parameterizing unit.

For performing a determination of conforming phase and magnitude values, the parameterizing unit 29 comprises as illustrated in FIG. 6 a re-initialization unit 29a, a transient analyzing unit 29b and a parameter selection unit 29c. The re-initialization unit 29a is configured for re-initializing the anti-noise control unit 21 with phase and magnitude parameters specified by the parameter selection unit 29c. The re-initialization can include the resetting of the anti-noise control unit 21 in an initial state prior to starting a regulation operation with altered phase and magnitude parameters, but may also be constrained by an alteration of these control values only. The transient analyzing unit 29b is configured to determine the temporal characteristic of the control signal or measurement signal subsequent to an alteration of the parameters on which the control signal generation is based. The parameter selection unit 29c is configured to determine the phase and magnitude parameters used by the anti-noise control unit 21 and for selecting differing parameters as described above for determining the conforming parameter values.

For determining the transient response after an alteration of the parameters on which the control signal generation is based and for establishing the transient time, embodiments of the transient analyzing unit 29 comprise an amplitude determination module (not shown in the figure) which identifies the changes of the amplitude values of the control signal or the measurement signal after the start of a transient response caused by altered parameters. Instability and transient time of a stable transient response are established by the transient analyzing unit 29b based on the temporal characteristic of the amplitude values.

Figure 7:
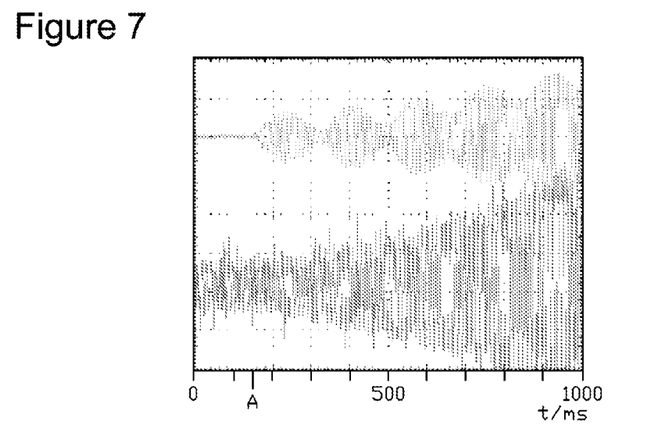
FIG. 7 illustrates an unstable regulator behaviour.

An unstable regulating behaviour manifests itself in oscillating amplitude values with the maximum value of the amplitudes usually increasing from oscillation period to oscillation period. This is illustrated in the diagram of FIG. 7, wherein the upper line represents the characteristics of the control signal and the lower line represents the characteristics of the measurement signal. The x-axis of the diagram extends over thousand milliseconds. Until time A, the anti-noise control unit 21 operates in normal condition producing a control signal corresponding to the current parameters. The microphone 13 thus measures the residual noise resulting from the superimposition of the noise produced by the engine with the anti-noise. From time A on, the generation of a control signal with altered phase and, possibly, magnitude parameters specified by the parameterizing unit 29 begins. Due to the instability of the transient response, the control signal generated results in no anti-noise, and the noise originating from the engine is no longer cancelled effectively. As a result of this, the amplitude values of the measurement signals increase more and more. To determine an unstable transient response, the output signal of the microphone 13 can therefore be used as an alternative to the control signal.

Figure 8:
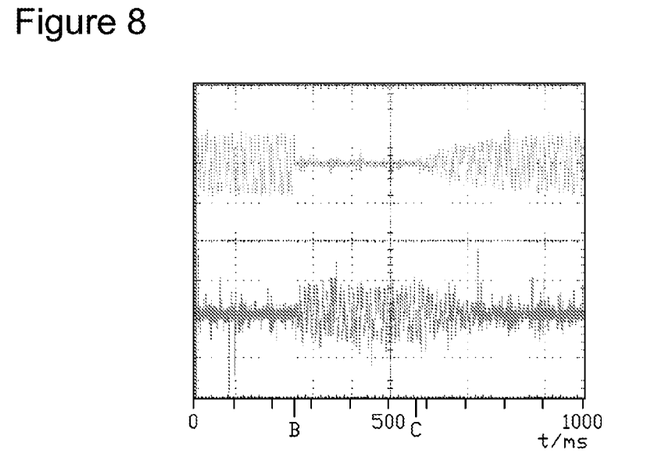
FIG. 8 illustrates a slow transient response.

A slow transient response is illustrated in FIG. 8. At time B, the parameterizing unit 29 resets the anti-noise control unit 21 into the initial state. At time C, the generation of the control signal using the phase and magnitude parameters specified by the parameterizing unit 29 begins. The increase of the amplitude values of the control signal beginning at time C extends like the decrease of the amplitudes of the measurement signal over about 300 ms. This behaviour does not occur in the second stage, if the value specified for the magnitude parameter by the parameterizing unit 29 is too high. Accordingly, the parameterizing unit 29 is configured to initiate the next re-initialization with a lower value for the magnitude parameter.

Figure 9:
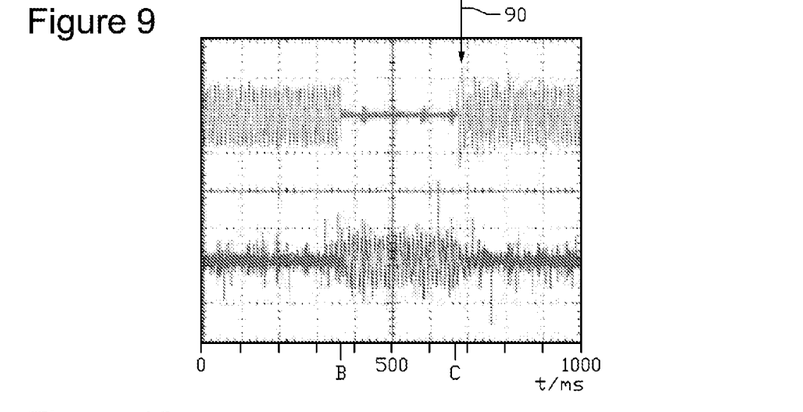
FIG. 9 illustrates an overshooting transient response.

FIG. 9 shows a transient response where the amplitude values of the control signal first increase rapidly after time C, and stabilize afterwards at lower values. This overshooting marked in the Figure by arrow 90 indicates in stage 2 that the value of the magnitude parameter has been selected too low, and that the next re-initialization has to be performed with an accordingly higher value.

Figure 10:
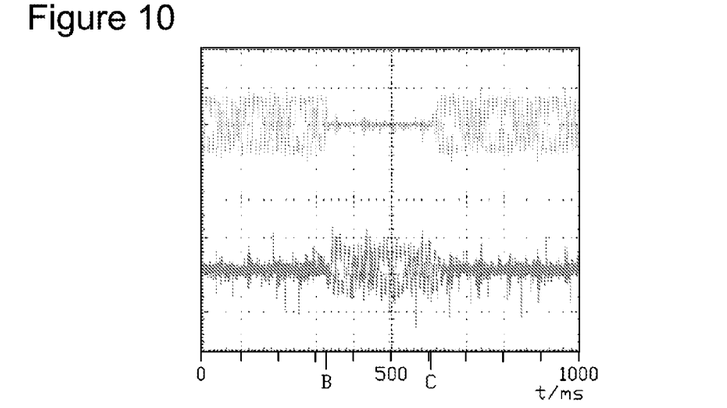
FIG. 10 illustrates a short transient response achieved with ideal values for phase and magnitude parameters.

If the phase parameter and magnitude parameter match the conforming parameters valid for the current transfer function, the transient time is very short, as shown in FIG. 10, and no overshooting takes place.

Figure 11:
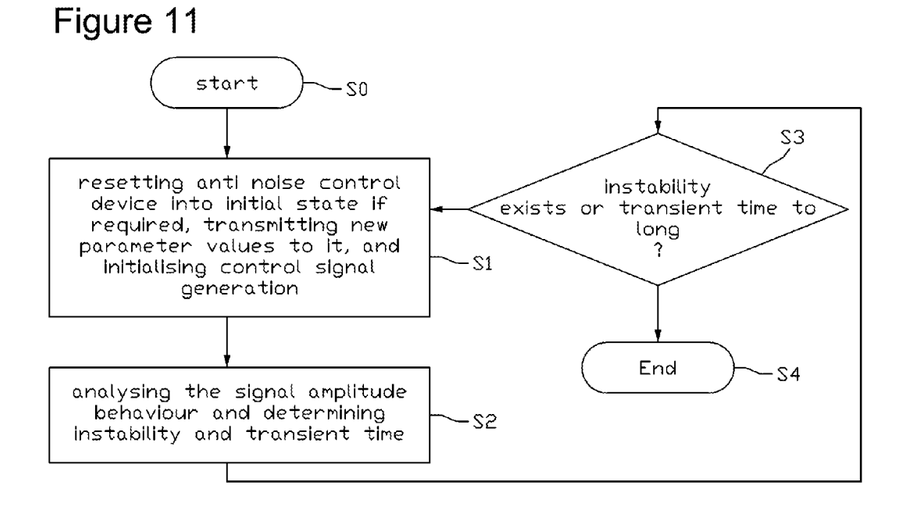
FIG. 11 illustrates in a flow chart the basic steps of a method for determining a conforming phase parameter and a conforming magnitude parameter.

FIG. 11 shows the basic steps of an embodiment of a method performed by the parameterizing unit 29 for determining conforming phase and magnitude parameters. The method can either be initiated manually, for instance in the framework of an initial gauging procedure, in the framework of diagnostic analysis of the active noise cancellation system, or automatically, for instance initiated by an increase of the effective value of the measurement signal in a dynamic operation of engine 1. The implementation of the method takes place in stationary or quasi-stationary operating conditions of the engine 15 where the rotational speed of the engine does not or not substantially change.

After starting the method in step S0 the parameterizing unit 29 prompts the anti-noise control unit 21 in step S1 to generate the control signal using altered parameter values whereby the control unit 21 may possibly be reset into an initial state as described above. In the next following step S2, the parameterizing unit 29 determines and analyses the characteristic of the control signal amplitudes and identifies the transient time therefrom or ascertains an unstable regulation behaviour, respectively. If the presence of an instability is ascertained in step S3, or the transient time is longer than a default or previously determined value, the method continues with step S1. Otherwise, the conforming parameters are determined, and the method ends in step S4. For carrying out the method, the parameterizing unit is preferably implemented in form of a data processing means.

The invention claimed is:

1. A system for generating anti-noise in an exhaust-gas line of a vehicle, comprising:
   a first electro acoustic transducer configured for generating a first acoustic signal based on an electric control signal, and being in communication with the exhaust-gas line via an acoustic line, with the first acoustic signal entering the exhaust line in form of anti-noise after having passed the acoustic line;
   a second electro acoustic transducer configured for generating an electric measurement signal representing a second acoustic signal, and being in acoustic communication with the exhaust-gas line at the anti-noise coupling region;
   a control unit configured for generating the control signal based on the measurement signal; and
   parameterizing unit adapted for determining a conforming phase parameter and a conforming magnitude parameter for the control function used by the control unit based on the transient response of the control unit, wherein the parameterizing unit is configured for determining at least one of a temporal characteristic of the control signal and the measurement signal and wherein the parameterizing unit is configured to determine a transient time, an overshooting behaviour, and an instability of the operation for generating the control signal performed by the control unit from the temporal characteristics of at least one of the control signal and the measurement signal.

2. A system according to claim 1, wherein the parameterizing unit is configured for reinitializing the control unit, and wherein re-initialization comprises an initiating of the generation of the control signal using at least one of a specific phase parameter and a magnitude parameter.

3. A system according to claim 1, wherein the parameterizing unit is configured to determine two borderline phase parameters from the different phase parameters ranging from −π to +π used for re-initializing the control unit, with the borderline phase parameters yielding an unstable control operation in which the control signal exhibits an oscillating behavior, and enclosing an interval of phase parameters yielding a stable control operation in which the control signal exhibits less oscillation than during the unstable control operation.

4. A system according to claim 3, wherein the conforming phase parameter is half the sum of the two borderline phase parameters.

5. A system for generating anti-noise in an exhaust-gas line of a vehicle, comprising:
   a first electro acoustic transducer configured for generating a first acoustic signal based on an electric control signal, and being in communication with the exhaust-gas line via an acoustic line, with the first acoustic signal entering the exhaust line in form of anti-noise after having passed the acoustic line;
   a second electro acoustic transducer configured for generating an electric measurement signal representing a second acoustic signal, and being in acoustic communication with the exhaust-gas line at the anti-noise coupling region;
   a control unit configured for generating the control signal based on the measurement signal; and a parameterizing unit adapted for determining a conforming phase parameter and a conforming magnitude parameter for the control function used by the control unit based on the transient response of the control unit, wherein the parameterizing unit is configured to carry out the determination of the confirming magnitude parameters after a determination of the conforming phase parameters, and wherein the parameterizing unit is configured to determine a plurality of transient times, each transient time of the plurality of transient times determined at a re-initialization of the control unit, and to determine the conforming magnitude parameter as the magnitude parameter associated with the smallest resulting transient time of the plurality of transient times.

6. A system according to claim 5, wherein the different magnitude parameters are determined by multiplying the magnitude parameter used prior to a re-initialization by a factor having a value greater than zero.

7. A method for determining a conforming phase parameter and a conforming magnitude parameter for a system for generating anti-noise in an exhaust-gas line of a vehicle according to claim 1, comprising the following steps:
   a) Initializing the generation of a control signal by the control unit using a phase parameter ranging from −π to +π,
   b) Determining the amplitude characteristics of the control signal,
   c) Analysing if the amplitude values of the amplitude characteristics show an oscillation behaviour,
   d) Storing the phase parameters with a tag, the tag indicating if there is evidence for an oscillation behaviour or not,
   e) Surveying the phase parameters stored with a tag for the presence of two phase parameters having a tag indicating an oscillation behaviour and enclosing only phase parameters having tags indicating no oscillation behaviour,
   f) In the event of the survey in step e) yielding a negative result: continuing the method at step a) with the proviso that a phase parameter is used in step b) that is different from previously used phase parameters,
   g) Determining the conforming phase parameter to be half the sum of the two phase parameters identified in step e) in the event of the survey of step e) yielding a positive result,
   h) Resetting the control unit into an initial state, i) Initializing the generation of a control signal by the control unit using a magnitude parameter differing from the magnitude parameter used in steps a) to g) by a positive factor, j) Determining the amplitude characteristics of the control signal, k) Analyzing the amplitude characteristics for transient overshoots, l) Continuing the method at step h) with the proviso that a greater magnitude parameter is used in step i) when an overshoot is determined in step k), and determining the transient time from the amplitude characteristics when no overshoot is determined in step k), m) Checking if the transient time is smaller than a predetermined threshold value, n) Continuing the method at step h) with the proviso that smaller magnitude parameter is used in step i), when the check of step m) results a transient time greater or equal than the predetermined threshold value, and o) Determining the magnitude parameter used last as the conforming magnitude parameter, when the check of step m) results a transient time smaller than the predetermined threshold value.

8. A method according to claim 7, wherein the threshold value is a predetermined value or the smallest transient time determined previously.

9. A method according to claim 7, further comprising a step for resetting the control unit into an initial state, which is performed prior to step a).

10. A method according to claim 7, wherein it is further analysed in step c), if the maximum value of an amplitude oscillation period is greater than the maximum value of a previous amplitude oscillation period.

11. A motor vehicle with an internal-combustion engine and a system according to claim 1 for generating anti-noise in an exhaust-gas line of the engine.

12. A system according to claim 2, wherein re-initialization further comprises a prior resetting of the control unit into an initial state.

\* \* \* \* \*